United States Patent
Staudenmaier et al.

(10) Patent No.: US 9,483,856 B2
(45) Date of Patent: Nov. 1, 2016

(54) DISPLAY CONTROLLER WITH BLENDING STAGE

(75) Inventors: Michael Staudenmaier, Munich (DE); Vincent Aubineau, Gif sur Yvettes (FR); Davor Bogavac, Kallered (SE)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 65 days.

(21) Appl. No.: 14/394,682

(22) PCT Filed: Apr. 20, 2012

(86) PCT No.: PCT/IB2012/000992
§ 371 (c)(1),
(2), (4) Date: Oct. 15, 2014

(87) PCT Pub. No.: WO2013/156810
PCT Pub. Date: Oct. 24, 2013

(65) Prior Publication Data
US 2015/0109330 A1    Apr. 23, 2015

(51) Int. Cl.
G06T 11/60    (2006.01)
G06T 1/60    (2006.01)
H04N 21/2343    (2011.01)
H04N 21/426    (2011.01)

(52) U.S. Cl.
CPC .................. *G06T 11/60* (2013.01); *G06T 1/60* (2013.01); *G06T 2207/20221* (2013.01); *H04N 21/234327* (2013.01); *H04N 21/42653* (2013.01)

(58) Field of Classification Search
None
See application file for complete search history.

(56) References Cited

U.S. PATENT DOCUMENTS

| 6,023,302 | A | * | 2/2000 | MacInnis | H04N 9/75 348/586 |
| 6,028,583 | A | * | 2/2000 | Hamburg | G06T 15/503 345/589 |
| 6,985,161 | B1 | | 1/2006 | Politis | |
| 7,483,042 | B1 | | 1/2009 | Glen | |

(Continued)

FOREIGN PATENT DOCUMENTS

EP    1365385 B1    11/1999

OTHER PUBLICATIONS

International Search Report and Written Opinion correlating to PCT/IB2012/000992 dated Dec. 21, 2012.

*Primary Examiner* — Edward Martello

(57) ABSTRACT

A display controller comprising a blending stage and a blending controller. The blending stage is provided for blending multiple image layers into one display output image and comprises a plurality of input channels for receiving pixel data for the multiple image layers. The blending stage further comprises multiple blenders for combining the pixel data received by at least two input channels of the plurality of input channels. The blending controller is coupled to the blending stage for controlling operation of the blending stage. The blending stage further comprises a controllable switch for coupling an output of at least one blender of the multiple blenders to a display output of the blending stage for regular on-the-fly blending or to an offline blending memory for storing a result of an offline blending task. The blending controller comprises an input for receiving layer data describing locations and/or properties of the multiple image layers and a predictor for, based on the layer data, predicting an availability of the at least one blender. The blending controller is further operative to control the blending stage to perform the offline blending task in dependence of the predicted availability.

20 Claims, 3 Drawing Sheets

(56) References Cited

U.S. PATENT DOCUMENTS

| | | | |
|---|---|---|---|
| 2003/0193512 A1* | 10/2003 | Komagata | G09G 5/397 345/629 |
| 2003/0206180 A1* | 11/2003 | Ehlers | G09G 5/026 345/604 |
| 2005/0213853 A1 | 9/2005 | Maier et al. | |
| 2007/0002072 A1 | 1/2007 | Frensch et al. | |
| 2010/0066762 A1 | 3/2010 | Yeh et al. | |
| 2010/0156934 A1* | 6/2010 | Zhang | G09G 5/377 345/629 |
| 2011/0285748 A1* | 11/2011 | Slatter | G06T 11/60 345/629 |

\* cited by examiner

DISPLAY CONTROLLER WITH BLENDING STAGE

FIELD OF THE INVENTION

This invention relates to a display controller, a method for controlling a blending stage of a display controller and a computer program product for causing a processor to perform such a method.

BACKGROUND OF THE INVENTION

Display controllers are typically used in television control electronics, e.g. devices connectable to a separate display such as set top boxes, home network computers or car display systems or integrated in a display, e.g. in a digital television. The display controller receives display pixel data from any combination of locally attached video and graphics input ports, processes the data, and produces final display pixels as output. The display output may comprise different layers of video and/or digital graphics data. A blending stage of the display controller may, e.g., comprise four input channels for receiving pixel data for four different layers. The input channels are coupled to blenders for combining two or more layers into a blended image. Multiple blended images may be further combined in additional blenders or may be provided as image output of the blending stage.

In such display controllers the amount of input channels in the blending stage introduces a hard limit to the maximum complexity of the resulting graphic content. If more complex graphics are desired, additional hardware components have to be added. For example, an extended blending stage with additional input channels and blenders may be used. However, in terms of costs and size of such components such solutions are not optimal.

SUMMARY OF THE INVENTION

The present invention provides a display controller, a method for controlling a blending stage of a display controller and a computer program as described in the accompanying claims. Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

DETAILED DESCRIPTION OF THE PREFERRED EMBODIMENTS

Figure 1:
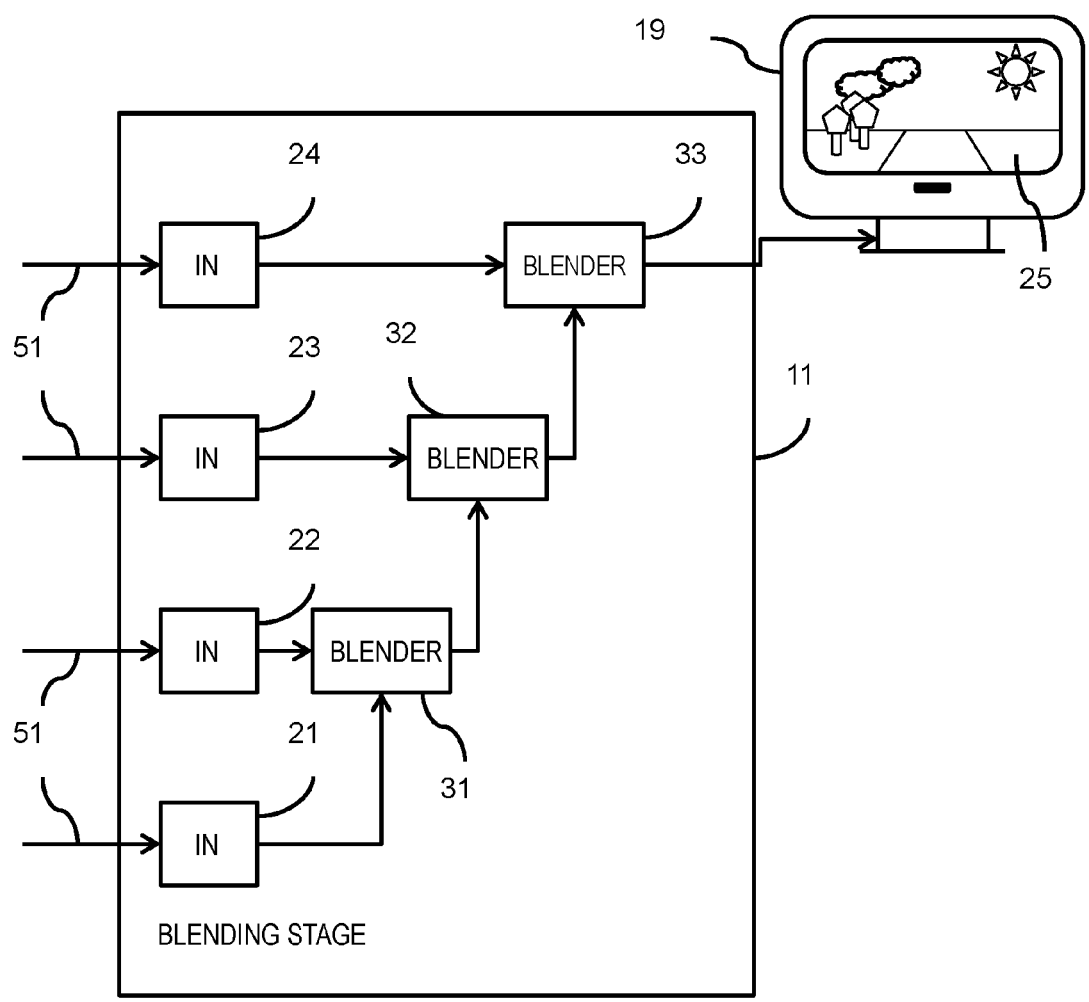
FIG. 1 schematically shows a block diagram of part of an example of a known display controller, FIG. 2 schematically shows a block diagram of part of another example of a display controller.

According to a first aspect of the invention, this object is achieved by providing a display controller with a blending stage for blending multiple image layers into one display output image and a blending controller being coupled to the blending stage for controlling operation of the blending stage. The blending stage comprises a plurality of input channels for receiving pixel data for the multiple image layers and multiple blenders for combining the pixel data received by at least two input channels of the plurality of input channels. The blending stage further comprises a controllable switch for coupling an output of at least one blender of the multiple blenders to a display output of the blending stage for regular on-the-fly blending or to an offline blending memory for storing a result of an offline blending task. The blending controller comprises an input for receiving layer data describing locations and/or properties of the multiple image layers and a predictor for, based on the layer data, predicting an availability of the at least one blender. The blending controller is operative to control the blending stage to perform the offline blending task in dependence of the predicted availability.

The controllable switch and the offline blending memory make it possible to also use the full capacity of the blending stage, when a current display output image or part of the current display output image is not so complex and not all the input channels and blenders are needed for on-the-fly blending. Based on the received layer data, the predictor of the blending controller can determine when part of the blending stage processing capacity will be available for offline blending tasks. The blending controller temporarily allocates input channels and blenders for offline blending tasks when they are not used for on-the-fly blending, e.g. when one or more of the layers or parts of the layers are empty. The results of such offline blending tasks are then stored in the offline blending memory and may be used later for combination into other, more complex images. For example, with the help of offline blending it becomes possible to composite a display output image with six layers while the blending stage only comprises four input channels.

The offline blending memory may be a specially provided dedicated memory for storing the results of the offline blending tasks, but may also be part of a usual on-chip or off-chip SRAM/DDR-RAM memory.

The offline blending tasks may be provided to the blending controller as separate input data or the blending controller may define the offline blending tasks itself, based on the available layer data. The blending controller could not only determine when one or more blenders are available for offline blending tasks, but it could also determine that for some of the upcoming output images, or parts of said output images, additional offline blending tasks would be necessary or beneficial.

An output of the offline blending memory may be coupled to an input of any one of the multiple blenders for allowing combining the result of the offline blending task with other pixel data.

According to a further aspect of the invention, a method is provided for controlling a blending stage of a display controller, the method comprising receiving layer data describing locations and/or properties of multiple image layers of a display output image, based on the layer data predicting an availability of at least one blender of multiple blenders of a blending stage, assigning an offline blending task to the at least one blender, and controlling a controllable switch of the blending stage to couple an output of the at least one blender to an offline blending memory for storing a result of the offline blending task.

FIG. 1 schematically shows part of a display controller. The display controller comprises a blending stage BS 11. At four input channels, IN, 21, 22, 23, 24 of the blending stage 11, pixel data, PD, 51 is received for the multiple image layers of an output image 25. The output image 25 may comprise different layers of video and/or digital graphics data. In this blending stage 11 with four input channels 21-24, a maximum of four different layers can be combined into one output image 25. However, not all output images 25 and all areas of the output images 25 need to comprise pixel data 51 from four different layers. The input channels 21-24 are coupled to blenders 31, 32, 33 for combining two or more layers into a blended image. Multiple blended images may be further combined in additional blenders 32, 33 or may be provided as image output 25 of the blending stage 11. In this example, a first blender 31 combines the pixel data 51 of the layers provided at the first two input channels 21, 22 and the output of this first blender 31 is provided to a second blender 32 for combination with pixel data 51 from the third input channel 23. The output of the second blender 32 and the pixel data from the fourth input channel 24 are blended together to form the output image 25 that is sent to a display screen 19 for display.

Figure 2:
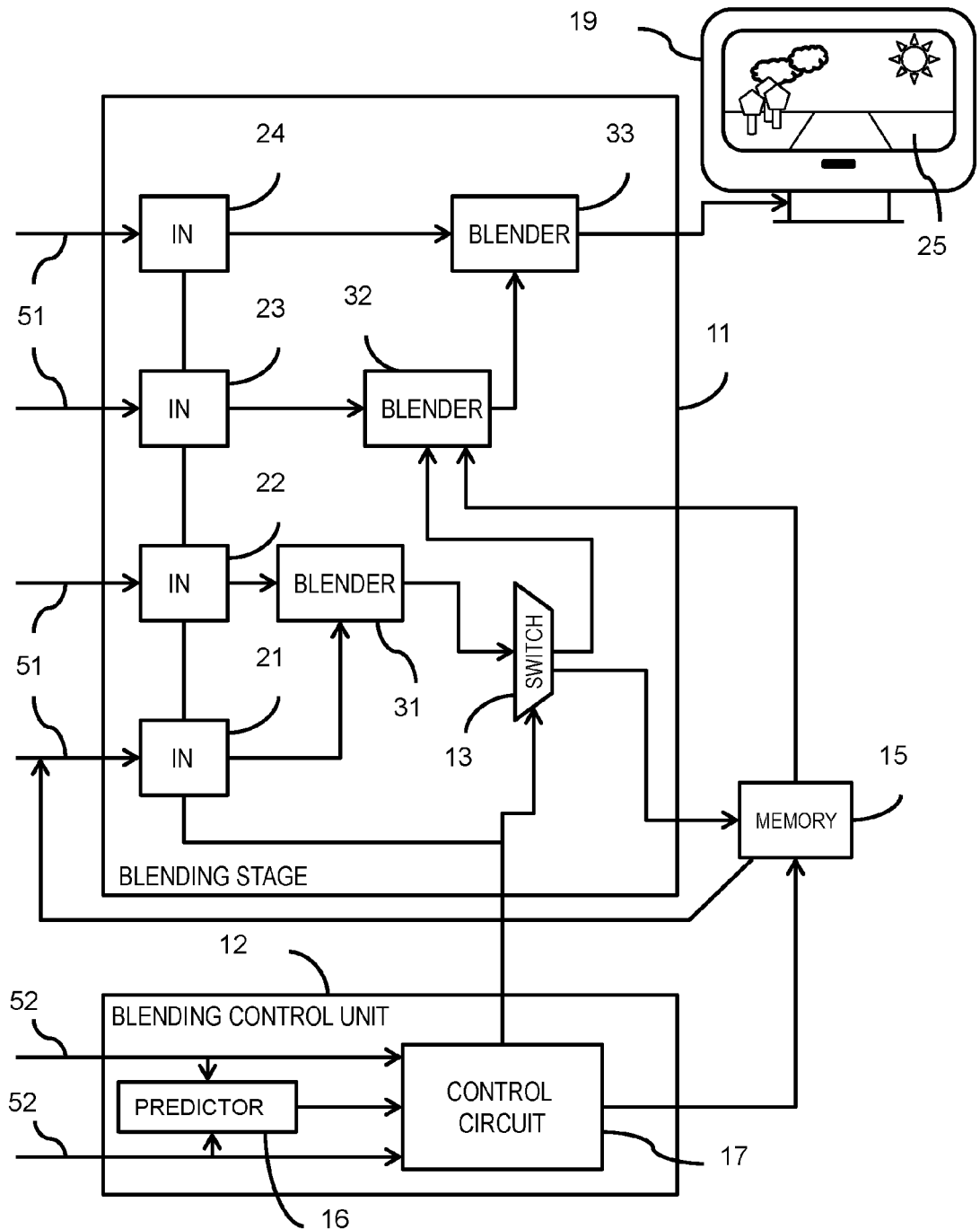

FIG. 2 schematically shows part of another example of a display controller. In this example, the blending stage 11 is coupled to a blending control unit 12 for controlling the blending processes. The blender control unit 12 comprises a control circuit CC 17 for, based on received layer data LD 52, controlling what pixel data 51 is submitted to which blender 31-33. The control circuit 17 also controls a switch S 13 for making it possible to send the results of an offline blending task to an offline blending memory MEM 15. When the full capacity of the blending stage 11 is needed for on-the-fly blending, the blending results of the first blender 31 are passed on in the direction of the blending stage output, here via additional blenders 32, 33. When the blending controller 12 detects some available blending capacity for performing offline blending tasks, the output of the first blender 31 can be diverted to the offline blender memory 15. In this example, only one blender 31 is coupled to the offline blending memory 15, but a similar switch 13 may be provided for coupling other blenders 32, 33 to the same or an additional offline blending memory 15.

In order to determine whether a blender 31 is available for performing offline blending tasks, a predictor PR 16 of the blending control unit 12 analyses layer data 52 describing locations and properties of the multiple image layers. The predictor 16 may detect that at some moment in time not all blenders are needed for on-the-fly blending. For example, from analysis of the layer data 52, it may be determined that the image to be processed at that moment consists of fewer layers than the number of blenders. The predictor 16 may also find out that some upcoming output image 25 comprises more than four image layers, which means that some offline blending tasks have to be scheduled. The control circuit 17 then controls the blending stage 11 to perform these offline blending tasks at the desired moment and controls the switch 13 such that the offline blending results are stored in the offline blending memory 15. Later on, the offline blending results can be used for on-the-fly blending with pixel data 51 of other image layers. The offline blending results may be provided as input pixel data 51 at one of the input channels 21 or may be fed to one of the blenders 32 directly from the offline blending memory 15. In this way, more complex output images 25 can be constructed. The maximum complexity of the output graphic content is not limited by the amount of input channels. With, e.g., four input channels, five six or even more layers can be blended into one output image, without needing additional blenders or input channels. Although the offline blending tasks may be generated by the predictor 16 or control circuit 17 of the blending control unit 12, the offline blending tasks or part of the offline blending tasks may also be provided as blending task data, BT, 53 by other software or hardware components of the display controller.

Figure 3:
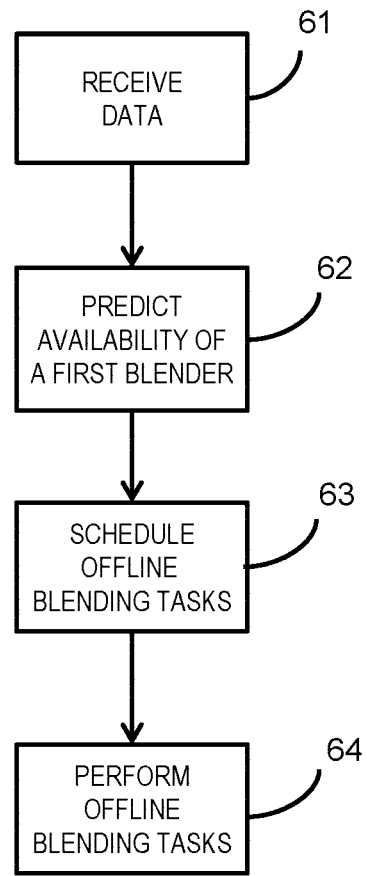
FIG. 3 shows a flow chart of an example of a method for controlling a blending stage suitable for the example of FIG. 2.

FIG. 3 shows a flow diagram of a method for controlling a blending stage 11 suitable for the example of FIG. 2. The different stages of this method may be performed by the predictor 16 and or the control circuit 17 of the blending control unit 12. It will be apparent that although, for sake of explanation, the flow chart shows separate blocks, the stages may overlap e.g. in time and in different order where suitable. In a data receiving stage 61 the blending control unit 12 receives layer data 52 describing locations and/or properties of multiple image layers of a display output image 25. The locations may, e.g., relate to a position (z-coordinate) in the stack of layers or, when a layer is not present in the whole output image, areas or positions (x,y-coordinates) in the output image. The properties may relate to, e.g., colors and transparency values. Then, based on the layer data 52 an availability of the first blender 31 of the blending stage 11 at one or more moments in time is predicted in availability prediction stage 62. The blender 31 is considered available when it is not needed for on the-the-fly blending because the output image 25 or part of the output image being processed at that moment does not require the full processing capacity of the blending stage 11. If the blending stage 12 comprises more blenders that could be used for offline blending, the same prediction should be made for the other ones.

In dependence of the predicted availability, offline blending tasks are scheduled and assigned to the blender 31 in assignment stage 63. The offline blending tasks may be generated by the blending control unit 11 itself or may be provided as input data 53 coming from other components of the display controller or from the application software. In order to ensure that the right offline blending tasks are performed at the scheduled moments in time, the blending controller 11 makes it possible that the required pixel data 51 is available at the right input channel 21, 22 when needed. For this purpose, the blending controller 11 may, e.g., control the input channels 21-24 of the blending stage 11 and/or output buffers of other parts of the display controller which provide pixel data 51 to the input channels 21-24.

When the offline blending tasks are actually performed by the blender 31 in offline blending stage 64, the control circuit 17 controls the controllable switch 13 of the blending stage 12 to couple the output of the blender 31 to the offline blending memory 15 for storing a result of the offline blending task in said offline blending memory.

The invention may also be implemented in a computer program for running on a programmable apparatus, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a computer readable storage medium or transmitted to the computer system via a computer readable transmission medium. All or some of the computer program may be provided on tangible or non-tangible computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few. In the foregoing specification, the invention has been described with reference to specific examples of embodiments of the invention. It will, however, be evident that various modifications and changes may be made therein without departing from the broader spirit and scope of the invention as set forth in the appended claims and that the claims are not limited to the specific examples shown or described. For example, the connections may be an type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, circuit details have not been explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of the display controller are circuitry located on a single integrated circuit or within a same device. Alternatively, the display controller may include any number of separate integrated circuits or separate devices interconnected with each other. For example, memory may be located on a same integrated circuit as masters and or on a separate integrated circuit or located within another peripheral or slave discretely separate from other elements of the display controller. Peripheral and I/O circuitry may also be located on separate integrated circuits or devices. Also for example, the display controller or portions thereof may be soft or code representations of physical circuitry or of logical representations convertible into physical circuitry. As such, the display controller may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of the display controller, for example, from transitory or non-transitory computer readable media such as memory or other media on other computer systems. Such computer readable media may be permanently, removably or remotely coupled to an information processing system such as the display controller. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

Also, devices functionally forming separate devices may be integrated in a single physical device.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A display controller, comprising:
   a blending stage to blend multiple image layers into one display output image, the blending stage comprising having a plurality of input channels for receiving pixel data for the multiple image layers and multiple blenders for combining the pixel data received by at least two input channels of the plurality of input channels; and
   a controllable switch to couple an output of at least one blender of the multiple blenders to a display output of the blending stage for regular on-the-fly blending in response to a first condition, and to an offline blending memory for storing a result of an offline blending task in response to a second condition,
   a blending controller coupled to the blending stage, for controlling operation of the blending stage, and
   the blending controller having an input to receive layer data describing one or more of locations and properties of the multiple image layers, and a predictor to, based on the layer data, predict an availability of the at least one blender, the blending controller further being operative to control the blending stage to perform the offline blending task in dependence of the predicted availability, and to control said controllable switch accordingly.

2. A display controller as claimed in claim 1, wherein the blending controller further comprises an input for receiving the offline blending task.

3. A display controller as claimed in claim 1, wherein the blending controller is configured to generate the offline blending task based on the received layer data.

4. A display controller as claimed in claim 1, wherein an output of the offline blending memory is coupled to an input of any one of the multiple blenders for allowing combining the result of the offline blending task with other pixel data.

5. A display controller as claimed in claim 1, wherein an output of the offline blending memory is coupled to an input of any one of the multiple input channels to provide the result of the offline blending task as pixel data to the blending stage.

6. The display controller of claim 1, wherein the predictor to predict the availability of the at least one blender based on the received layer data indicating that consists of fewer layers than a number of blenders of the multiple blenders.

7. The display controller of claim 1, the blending controller to schedule an offline blending task in response to the layer data including more layers than a number of blenders of the multiple blenders.

8. A method of controlling a blending stage of a display controller, the method comprising:
   receiving layer data describing one or more of locations and properties of multiple image layers of a display output image,
   based on the layer data predicting an availability of at least one blender of multiple blenders of a blending stage,
   in dependence of the predicted availability, assigning an offline blending task to the at least one blender, and
   controlling a controllable switch of the blending stage to couple an output of the at least one blender to an offline blending memory for storing a result of the offline blending task.

9. A method of controlling a blending stage of a display controller as claimed in claim 8, further comprising receiving the offline blending task.

10. A method of controlling a blending stage of a display controller as claimed in claim 8, further comprising generating the offline blending task based on the received layer data.

11. A method of controlling a blending stage of a display controller as claimed in claim 8, further comprising providing the result of the offline blending task stored in the offline blending memory to an input of any one of the multiple blenders and combining the result of the offline blending task with other pixel data.

12. A method of controlling a blending stage of a display controller as claimed in claim 8, further comprising providing the result of the offline blending task stored in the offline blending memory to an input of any one of the multiple input channels for providing the result of the offline blending task as pixel data to the blending stage.

13. The method of claim 8, further comprising:
   predicting the availability of the at least one blender is based on the received layer data indicating that consists of fewer layers than a number of blenders of the multiple blenders.

14. The method of claim 8, further comprising:
   scheduling an offline blending task in response to the layer data including more layers than a number of blenders of the multiple blenders.

15. A non-transitory computer program product for controlling a blending stage of a display controller, which program is operative to cause a processor to:
   receive layer data describing one or more of locations and properties of multiple image layers of a display output image,
   based on the layer data predicting an availability of at least one blender of multiple blenders of a blending stage,
   in dependence of the predicted availability, assign an offline blending task to the at least one blender, and
   control a controllable switch of the blending stage to couple an output of the at least one blender to an offline blending memory for storing a result of the offline blending task.

16. The non-transitory computer program product of claim 15, the non-transitory computer program further to cause the processor to:
   receive the offline blending task.

17. The non-transitory computer program product of claim 15, the non-transitory computer program further to cause the processor to:
   generate the offline blending task based on the received layer data.

18. The non-transitory computer program product of claim 15, the non-transitory computer program further to cause the processor to:
   provide the result of the offline blending task stored in the offline blending memory to an input of any one of the multiple blenders and combine the result of the offline blending task with other pixel data.

19. The non-transitory computer program product of claim 15, the non-transitory computer program further to cause the processor to:
provide the result of the offline blending task stored in the offline blending memory to an input of any one of the multiple input channels for providing the result of the offline blending task as pixel data to the blending stage.

20. The non-transitory computer program product of claim 15, the non-transitory computer program further to cause the processor to:
predict the availability of the at least one blender is based on the received layer data indicating that consists of fewer layers than a number of blenders of the multiple blenders.

* * * * *